(12) United States Patent
Dielacher et al.

(10) Patent No.: US 10,602,073 B2
(45) Date of Patent: Mar. 24, 2020

(54) GLOBAL PIXEL BINNING FOR AMBIENT LIGHT SENSING

(71) Applicant: Infineon Technologies AG, Neubiberg (DE)

(72) Inventors: Markus Dielacher, Graz (AT); Martin Flatscher, Graz (AT); Robert Lobnik, Bad Eisenkappel (AT)

(73) Assignee: Infineon Technologies AG, Neubiberg (DE)

( * ) Notice: Subject to any disclaimer, the term of this patent is extended or adjusted under 35 U.S.C. 154(b) by 21 days.

(21) Appl. No.: 15/957,335

(22) Filed: Apr. 19, 2018

(65) Prior Publication Data

US 2019/0327405 A1   Oct. 24, 2019

(51) Int. Cl.
| | |
|---|---|
| *H04N 5/235* | (2006.01) |
| *H04N 5/232* | (2006.01) |
| *H04N 5/3745* | (2011.01) |
| *H04N 5/378* | (2011.01) |

(52) U.S. Cl.
CPC ....... *H04N 5/2353* (2013.01); *H04N 5/23245* (2013.01); *H04N 5/378* (2013.01); *H04N 5/3745* (2013.01)

(58) Field of Classification Search
CPC .. H04N 5/2353; H04N 5/23245; H04N 5/378; H04N 5/3745
See application file for complete search history.

(56) References Cited

U.S. PATENT DOCUMENTS

| | | | |
|---|---|---|---|
| 8,004,057 B2 | 8/2011 | Tian et al. | |
| 2004/0100574 A1* | 5/2004 | Voss ........................ | H04N 5/232 348/362 |
| 2008/0002043 A1* | 1/2008 | Inoue ..................... | H04N 5/232 348/296 |
| 2011/0234865 A1* | 9/2011 | Ogasahara ............. | H04N 9/045 348/281 |
| 2014/0071180 A1* | 3/2014 | Shin ........................ | G09G 5/10 345/690 |
| 2014/0263951 A1* | 9/2014 | Fan ......................... | H04N 5/378 250/208.1 |
| 2015/0130977 A1* | 5/2015 | Ladd ...................... | H04N 5/347 348/308 |
| 2016/0037070 A1* | 2/2016 | Mandelli .............. | H04N 5/3696 348/322 |

* cited by examiner

*Primary Examiner* — Ahmed A Berhan
(74) *Attorney, Agent, or Firm* — Harrity & Harrity, LLP

(57) ABSTRACT

An imaging system may comprise a plurality of pixels to selectively operate in a first operating mode or a second operating mode. When operating in the first operating mode, the plurality of pixels is binned during an exposure phase such that an output during a readout phase corresponds to a summed photocurrent that is a sum of a plurality of concurrent photocurrents, each corresponding to one of the plurality of pixels. When operating in the second operating mode, the plurality of pixels is not binned during the exposure phase such that an output during the readout phase corresponds to a set of separate photocurrents, each corresponding to one of a set of the plurality of pixels.

20 Claims, 8 Drawing Sheets

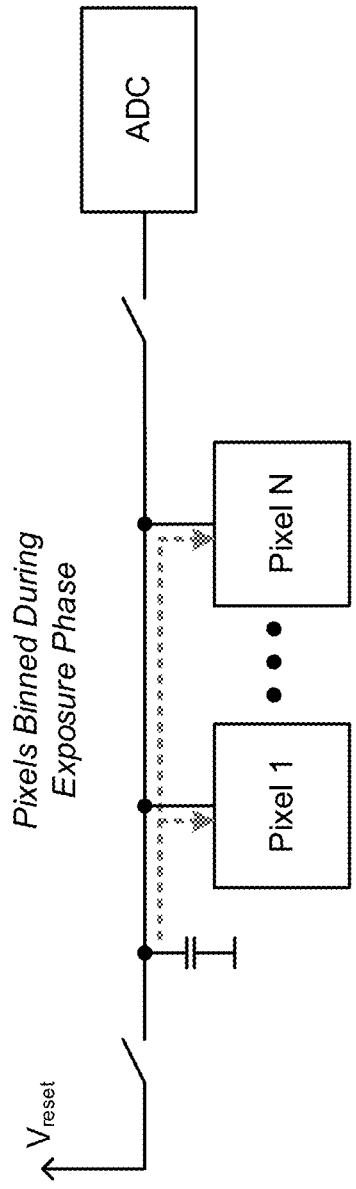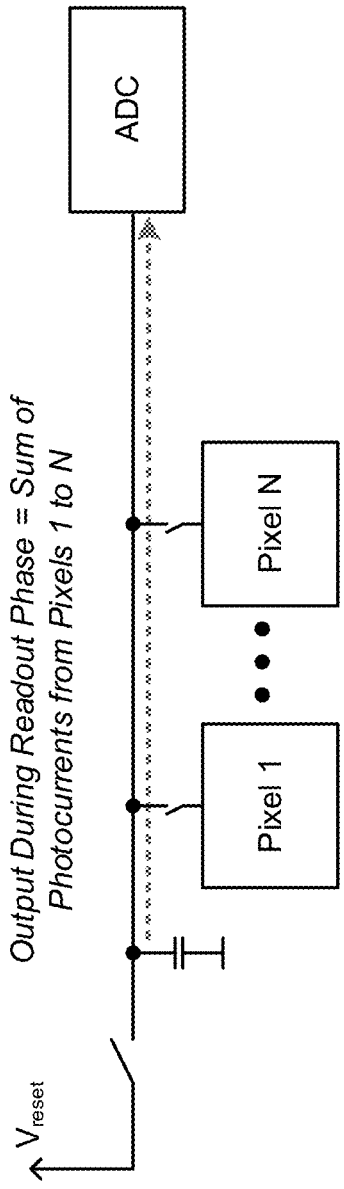

GLOBAL PIXEL BINNING FOR AMBIENT LIGHT SENSING

BACKGROUND

An imaging system may include an array of photosensitive pixels. A given photosensitive pixel absorbs light during an exposure phase, and outputs a signal during a readout phase. The signal output during the readout phase is a result of a photocurrent, generated by the photosensitive pixel, that corresponds to an amount of light absorbed by the photosensitive pixel during the exposure phase.

SUMMARY

According to some possible implementations, an imaging system may include, a plurality of pixels to selectively operate in a first operating mode or a second operating mode, wherein, when operating in the first operating mode, the plurality of pixels is binned during an exposure phase such that an output during a readout phase corresponds to a summed photocurrent that is a sum of a plurality of concurrent photocurrents, each corresponding to one of the plurality of pixels, and wherein, when operating in the second operating mode, the plurality of pixels is not binned during the exposure phase such that an output during the readout phase corresponds to a set of separate photocurrents, each corresponding to one of a set of the plurality of pixels.

According to some possible implementations, a method, performed by an imaging system including a plurality of pixels, may include binning the plurality of pixels during an exposure phase associated with the imaging system, wherein the plurality of pixels is binned during the exposure phase based on a plurality of individual reset switches being closed during the exposure phase, and a plurality of individual hold switches being open during the exposure phase, wherein each of the plurality of individual reset switches is included in a respective one of the plurality of pixels, and wherein each of the plurality of individual hold switches is included in a respective one of the plurality of pixels; and generating a summed photocurrent based on binning the plurality of pixels, wherein the summed photocurrent is a sum of a plurality of photocurrents, each generated by a respective one of the plurality of pixels.

According to some possible implementations, an imaging system may include a plurality of pixels, each including a respective individual reset switch and a respective individual hold switch; a global reset switch, wherein the global reset switch is connected to a reset voltage and to all of the pixels included in the plurality of pixels; and a global select switch, wherein the global select switch is connected to all of the pixels included in the plurality of pixels, and to an analog-to-digital convertor (ADC).

BRIEF DESCRIPTION OF THE DRAWINGS

FIGS. 1A and 1B are diagrams of an overview of an example implementation described herein;

DETAILED DESCRIPTION

Figure 2A:
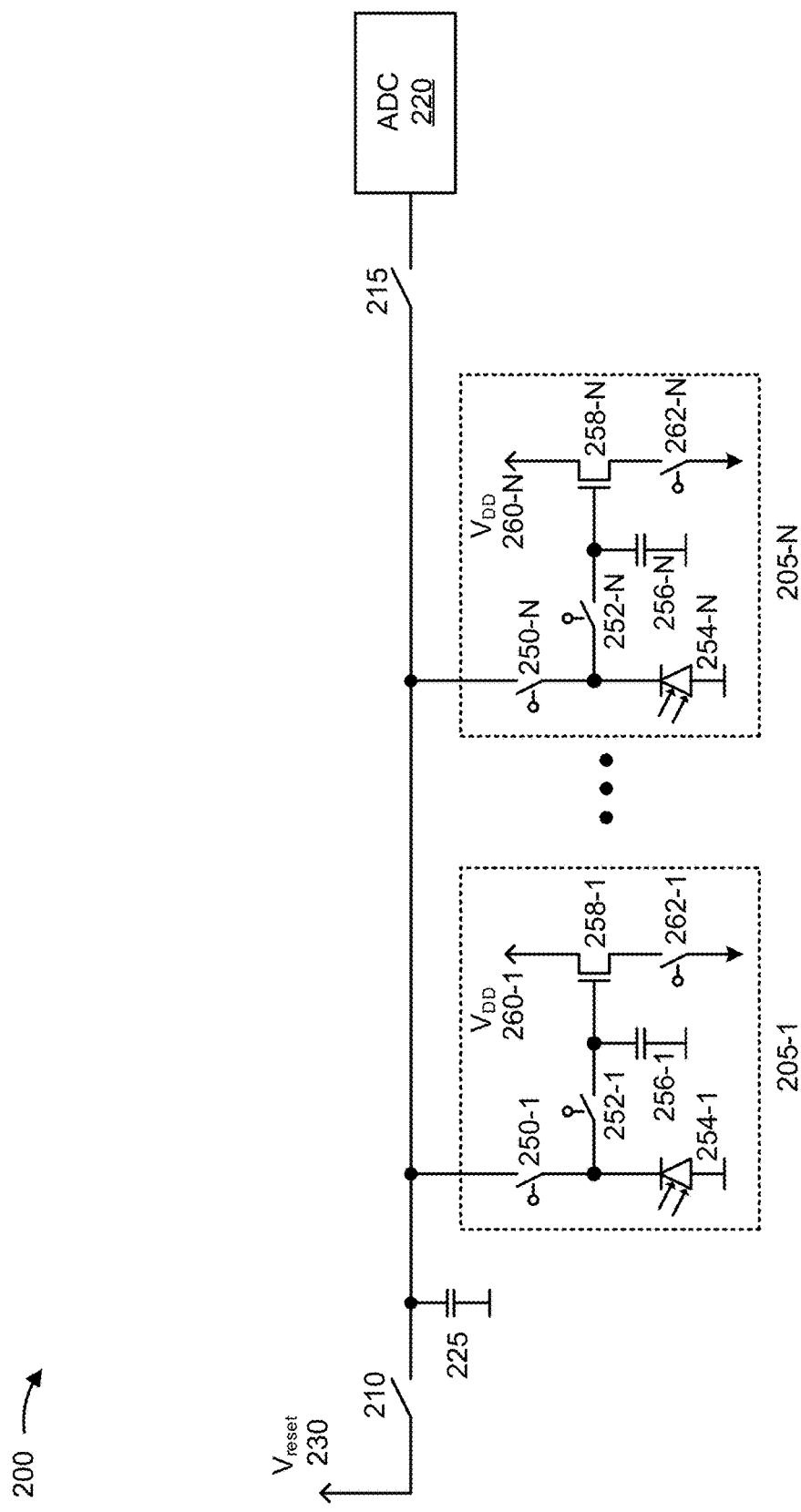
FIGS. 2A-2D are diagrams associated with an example imaging system including a plurality of pixels that can be selectively operated in a global binning mode or a standard mode, as described herein.

The following detailed description of example implementations refers to the accompanying drawings. The same reference numbers in different drawings may identify the same or similar elements.

A device may include multiple optical sensors. For example, a smartphone, or a similar type of device, may include multiple optical sensors adjacent to a display screen on a front side of the device. In some cases, these optical sensors can include an ambient light sensor (e.g., associated with adjusting a brightness of the display screen based on ambient light conditions), a proximity sensor (e.g., associated with disabling the display screen and/or a touch interface when the device is held to a user's ear), a red-green-blue (RGB) camera, a depth sensor (e.g., associated with performing facial recognition, and/or the like), and/or another type of optical sensor. As another example, the optical sensor can include a time-of-flight (ToF) sensor including a plurality of photosensitive pixels.

In operation, the ToF sensor can determine a distance to an object based on an amount of time that a modulated optical signal (e.g., a series of light pulses) takes to travel to, and back from, the object. The amount of time can be identified based on a difference between a phase of the modulated optical signal when emitted and a phase of the modulated optical signal when received by one or more photosensitive pixels. Here, since the speed of light is known, the distance can be determined based on the identified amount of time. The following embodiments will be described for a continuous wave (CW) ToF sensor, but it is to be understood that embodiments can be utilized in other ToF sensors. In a CW ToF sensor, light is continuously modulated during an emitted frame based on a modulation signal. The modulation signal may be a periodic signal having a rectangular (light on and off), a sine waveform or other waveforms. The modulation signal may have a frequency up to the RF range (for example up to 150 MHz) but other frequencies may also be used depending on application and technology. One or more of the photosensitive pixels receive a portion of the reflected light and the modulation signal to demodulate the reflected light. Demodulation may be based on photonic mixing in which the modulation signal is provided to each pixel to control a transfer of photo-generated charge carriers to opposing charge collection nodes within the pixel. In some embodiments, controlling may be based on providing the modulation signal to multiple gates which control and transfer the photo-generated charge carriers to the charge collection nodes. Based on the phase difference between the modulation signal and the received reflected light, photo-generated charge carriers are mainly transferred to one of the opposing charge collection nodes or to both charge collection nodes. The charges are stored over multiple periods of the modulation signal providing an integration in each pixel. After integration, the collected charges from both opposing charge collection nodes are read out and a phase difference of the reflected light with respect to the modulation signal can be determined therefrom.

Unfortunately, these multiple optical sensors may need a significant amount of area in a frame of the device, which may be undesirable when, for example, the amount of available area is limited, when a designer wishes to extend the display screen as close as possible to the edge of the device, and/or the like. Further, one or more of the optical sensors, such as a proximity sensor and a depth sensor, may require active illumination, meaning that light sources also have to be integrated. In some cases, an ambient light sensing functionality and proximity sensing functionality can be combined in a single optical sensor. However, other types of optical sensors are not combined, meaning that multiple optical sensors are still needed.

Some implementations described here provide an imaging system including a plurality of pixels capable of selectively operating in a global binning mode or a standard mode. In some implementations, the global binning mode is an operating mode in which the plurality of pixels are binned during an exposure phase such that an output during a readout phase corresponds to a sum of a plurality of photocurrents generated by the plurality of pixels. In some implementations, operation in the global binning mode allows the imaging system to provide ambient light sensing functionality and/or proximity sensing functionality, as described below.

Conversely, the standard mode is an operating mode in which the plurality of pixels is not binned during the exposure phase such that an output during the readout phase corresponds to a set of photocurrents, separately generated by a set of the plurality of pixels. As such, when operating in the standard mode, the imaging system may provide depth sensing functionality and/or another type of imaging functionality, as described below.

Thus, a single imaging system (e.g., a single optical sensor), as described herein, may be capable of being selectively operated in order to provide ambient light sensing functionality and/or proximity functionality, or another type of imaging functionality (e.g., depth sensing, RGB imaging, and/or the like), thereby reducing area consumption associated with providing these sensing functionalities, reducing a number of components needed to provide these sensing functionalities, reducing a cost associated with providing these sensing functionalities, and/or the like.

FIGS. 1A and 1B are diagrams of an overview of an example implementation 100 described herein. FIGS. 1A and 1B illustrate operation of a plurality of pixels (e.g., pixel 1 through pixel N (N>1)), included in an imaging system, in a global binning mode. In some implementations, the imaging system can provide ambient light sensing functionality and/or proximity sensing functionality when the plurality of pixels operates in the global binning mode. In some implementations, the plurality of pixels can selectively operate in the global binning mode or a standard mode, as described below.

FIG. 1A is a diagram illustrating operation of the plurality of pixels during an exposure phase of the global binning mode. As shown, in this example, during the exposure phase in the global binning mode, each of the plurality of pixels is connected to a common capacitor such that a charge stored in the common capacitor is discharged via the plurality of pixels (i.e., all of the plurality of pixels). Thus, during the exposure phase, each of the plurality of pixels concurrently generates a respective photocurrent based on discharging the charge. This results in a summed photocurrent in the imaging system, where the summed photocurrent is a sum of a plurality of photocurrents, each being generated by a respective one of the plurality of pixels. Here, the summed photocurrent is flowing in the common capacitor. At the end of the exposure phase, the plurality of pixels is disconnected from the common capacitor. A charge remaining in the common capacitor at the end of the exposure phase is therefore based on the summed photocurrent generated by the plurality of pixels. In this way, the plurality of pixels can be binned during the exposure phase while operating in the global binning mode.

FIG. 1B is a diagram illustrating operation of the plurality of pixels during a readout phase of the global binning mode. As shown, in this example, the capacitor is connected to an analog-to-digital convertor (ADC) during the readout phase. Here, a voltage signal, received by the ADC, corresponds to the charge remaining in the capacitor. Thus, the voltage signal received by the ADC corresponds to the summed photocurrent generated by the plurality of pixels. Here, since the summed photocurrent corresponds to a total amount of light absorbed by the plurality of pixels, the voltage signal corresponds to the total amount of light absorbed by the plurality of pixels. The ADC may convert the voltage signal to a digital signal representing the amount of absorbed light, and may output the digital signal for use in providing an ambient light sensing functionality, a proximity sensing functionality, and/or the like.

Notably, the imaging system can alternatively operate the plurality of pixels in a standard mode (e.g., an operating mode in which the plurality of pixels is not binned during the exposure phase such that an output during the readout phase corresponds to a set of the plurality of pixels). When operating in the standard mode, the imaging system may provide depth sensing functionality and/or another type of imaging functionality. Additional details regarding operation in the standard mode are described below.

In this way, the imaging system may selectively operate the plurality of pixels in the global binning mode or the standard mode. In some implementations, operation in the global binning mode or the standard mode, and operation in different phases of either of these modes may be initiated using appropriately arranged switches in in the imaging system, as generally illustrated in FIGS. 1A and 1B, and described in detail below.

As indicated above, FIGS. 1A and 1B are provided merely as examples. Other examples are possible and may differ from what was described with regard to FIGS. 1A and 1B. For example, while example implementation 100 is shown as including a switch to connect the plurality of pixels to a reset voltage, a switch to connect the plurality of pixels to an ADC, a capacitor for storing charge to be discharged by the plurality of pixels, etc., other implementations are possible, as described below.

FIGS. 2A-2D are diagrams associated with an example imaging system 200 including a plurality of pixels that can be selectively operated in a global binning mode or a standard mode, as described herein. In some implementations, imaging system 200 may include a complementary metal-oxide-semiconductor (CMOS) imager, such as a time-of-flight imager.

Figure 2B:
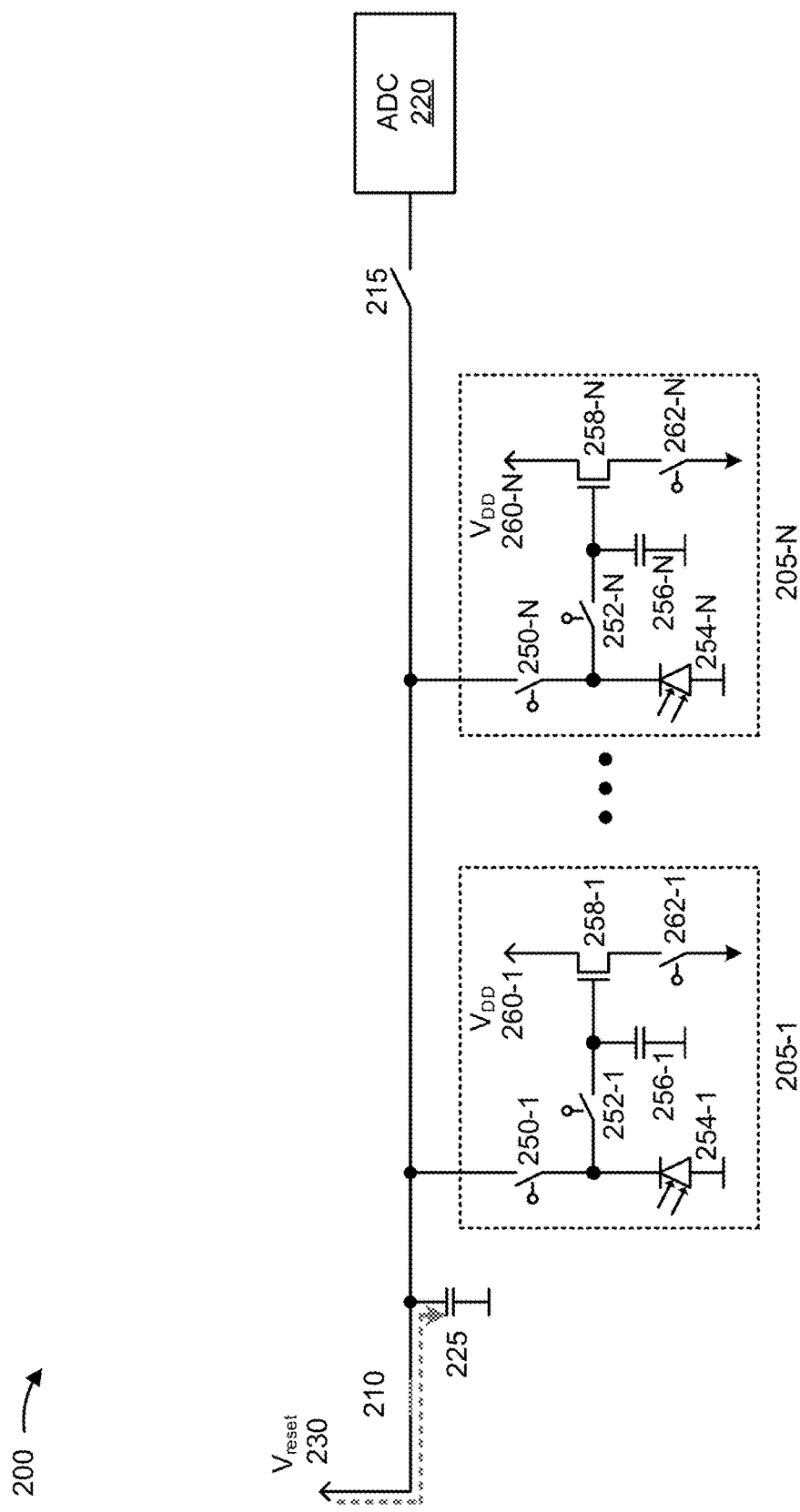
Figure 2C:
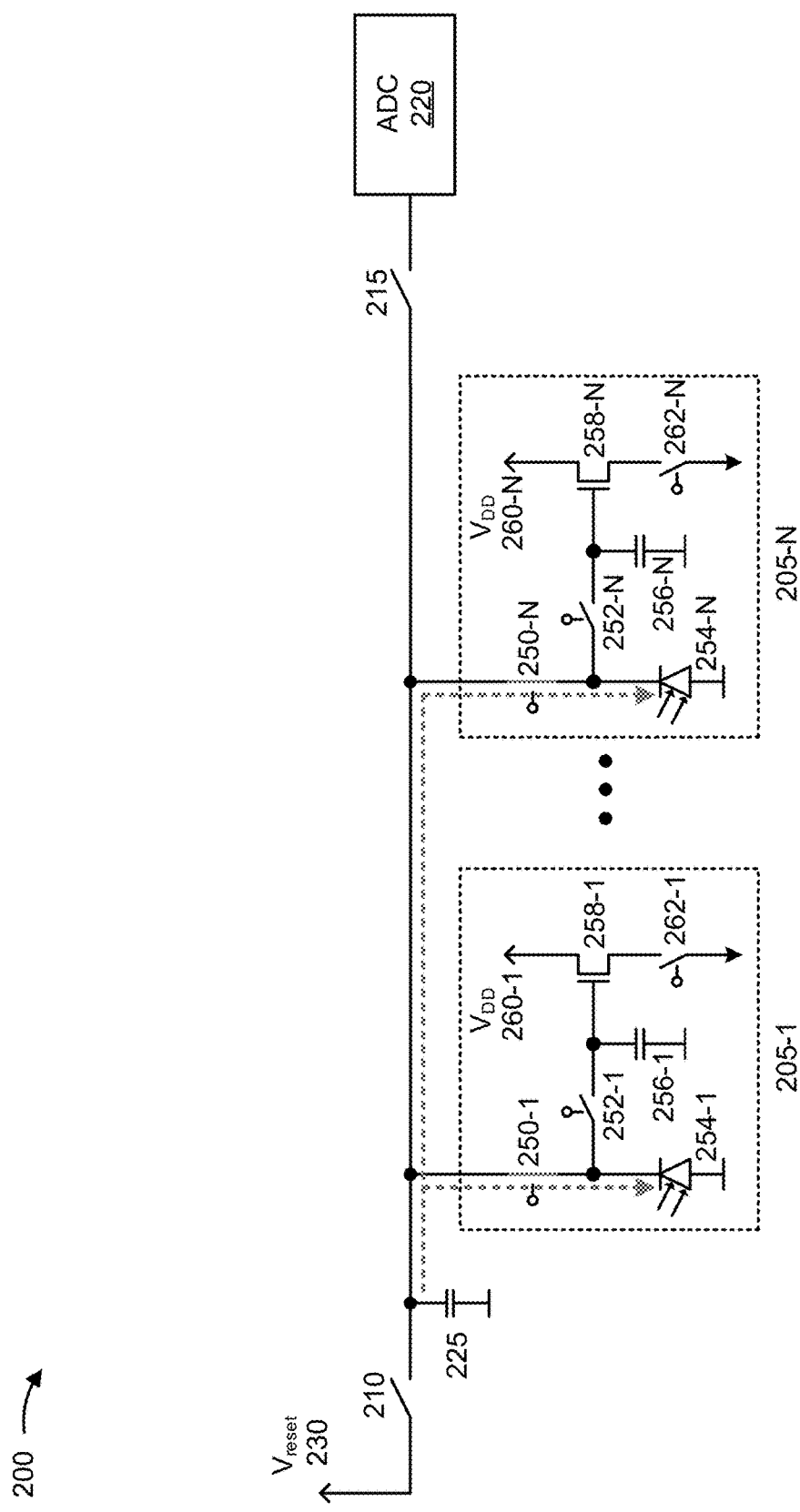
Figure 2D:
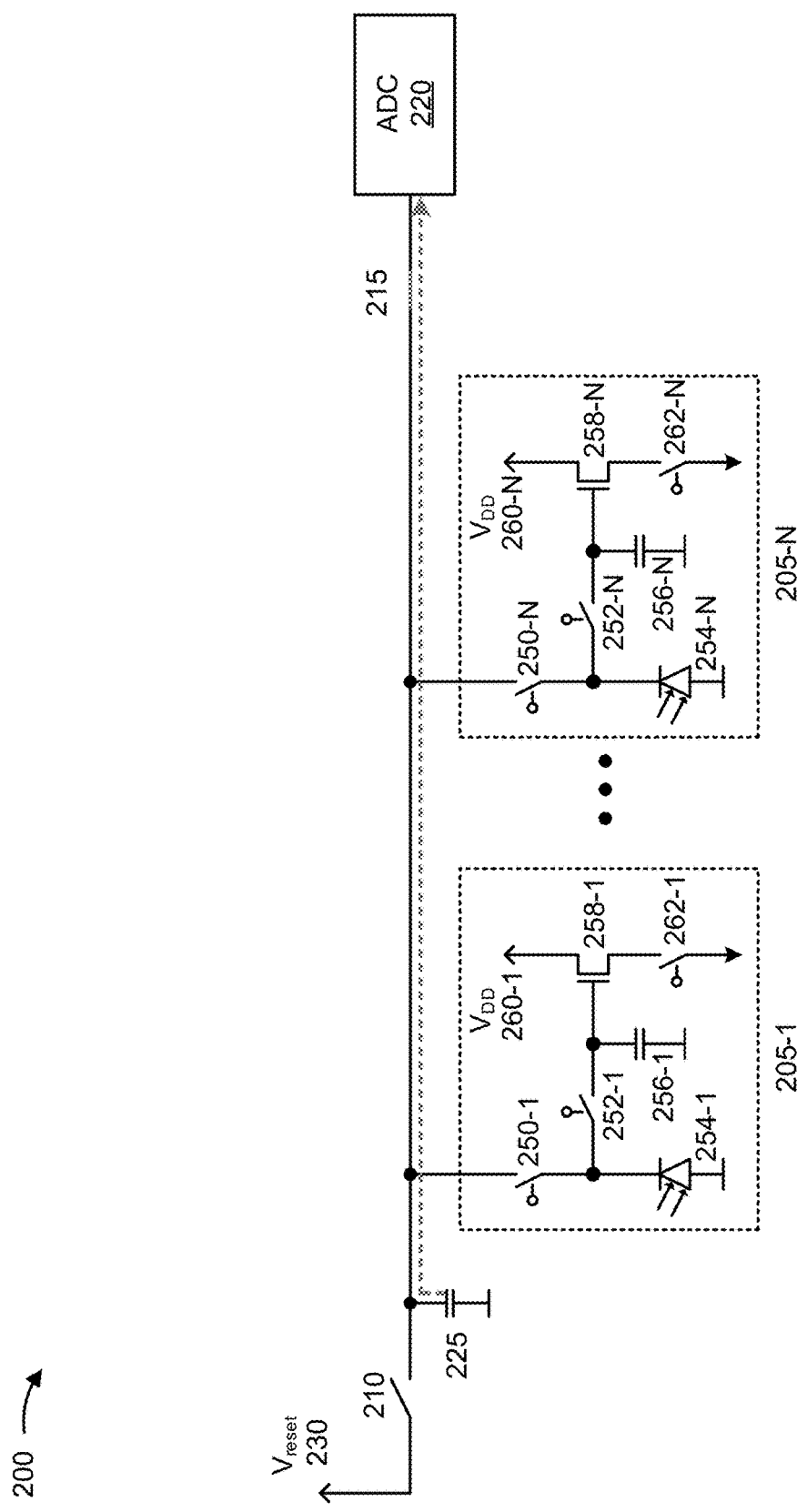

FIG. 2A illustrates components of imaging system 200, while FIGS. 2B-2D illustrate operation of the plurality of pixels in the global binning mode. As shown in FIG. 2A, imaging system 200 may include a plurality of pixels 205-1 through 205-N(N>1) (herein referred to collectively as a plurality of pixels 205, and individually as pixel 205), a global reset switch 210, a global select switch 215, an ADC 220, and a capacitor 225. As shown, imaging system 200 may be connected to a reset voltage 230.

Pixel 205 includes a photosensitive pixel capable of generating a photocurrent corresponding to an amount of light absorbed by pixel 205. In some implementations, pixel 205 may be selectively operated in the global binning mode or the standard mode, as described below. As shown in FIG. 2A, each pixel 205 may include an individual reset switch 250 (e.g., a switch associated with connecting pixel 205 to reset voltage 230 or capacitor 225), an individual hold switch 252 (e.g., a switch associated with connecting photodiode 254 to capacitor 256), a photodiode 254 (e.g., a component capable of absorbing light and generating a corresponding photocurrent), a capacitor 256 (e.g., a component to be discharged during operation in the standard mode), a readout amplifier 258 (e.g., operating as a source follower), and an individual select switch 262 (e.g., a switch associated with providing an individual output associated with pixel 205).

As described below, a state (e.g., open or closed) of individual reset switch 250 and/or a state of individual hold switch 252 may be controlled in order to cause pixel 205 to operate in the global binning mode or the standard mode, as described below. In some implementations, pixel 205 may be a 4-transistor pixel, or another type of pixel that includes a configuration of switches such that the global binning mode and the standard mode can be supported. As further shown, each pixel 205 may be connected to a supply voltage 260 (e.g., operating as a supply for readout amplifier 258), in some implementations.

Global reset switch 210 includes a switch to selectively connect capacitor 225 to reset voltage 230. In some implementations, global reset switch 210 can be implemented using a transistor. In some implementations, when the plurality of pixels 205 is operating in the global binning mode, global reset switch 210 may, during a reset phase, operate to reset capacitor 225 such that the plurality of pixels 205 can discharge capacitor 225 during an exposure phase, as described below.

Global select switch 215 includes a switch to selectively connect capacitor 225 to ADC 220. In some implementations, global select switch 215 can be implemented using a transistor. In some implementations, when the plurality of pixels 205 is operating in the global binning mode, global select switch 215 may, during a readout phase, operate to cause a voltage signal, associated with a summed photocurrent generated by the plurality of pixels 205, to be provided to ADC 220, as described below.

ADC 220 includes an analog-to-digital convertor to convert a voltage signal, resulting from a summed photocurrent generated by the plurality of pixels 205, to a digital signal, and outputting the digital signal for use in providing ambient light sensing functionality and/or proximity sensing functionality.

Capacitor 225 includes a component to store a charge (e.g., a charge corresponding to reset voltage 230) that is to be discharged by the plurality of pixels 205 during the exposure phase while the plurality of pixels 205 are operating in the global binning mode, as described below. In some implementations, capacitor 225 can be a dedicated device (e.g., a discrete capacitor). Alternatively, capacitor 225 may be provided via parasitic capacitance in one or more other components imaging system 200 (e.g., such that a dedicated capacitor is not needed).

In some implementations, imaging system 200 can selectively operate the plurality of pixels 205 in the global binning mode or the standard mode. FIGS. 2B-2D illustrate an example operation of the plurality of pixels 205 in the global binning mode.

FIG. 2B is an example illustrating operation of the plurality of pixels 205 during a reset phase when the plurality of pixels 205 are operating in the global binning mode. The reset phase is a phase during which capacitor 225 is reset based on reset voltage 230 such that capacitor 225 stores a charge corresponding to reset voltage 230.

As shown in FIG. 2B, during the reset phase when the plurality of pixels 205 are operating in the global binning mode, global reset switch 210 is closed (e.g., such that capacitor 225 is connected to reset voltage 230), and respective individual reset switches 250, included in the plurality of pixels 205, are open (e.g., such that the plurality of pixels 205 are disconnected from capacitor 225). Here, global select switch 215 can be open (e.g., such that ADC 220 is disconnected from the plurality of pixels 205) or can be closed. As indicated by the dotted arrow in FIG. 2B, capacitor 225 is charged based on reset voltage 230 when the plurality of pixels 205 are operating in the global binning mode.

FIG. 2C is an example illustrating operation of the plurality of pixels 205 during an exposure phase when the plurality of pixels 205 are operating in the global binning mode. The exposure phase is a phase during which the plurality of pixels 205 generate respective photocurrents based on light absorbed by photodiodes 254 included in the plurality of pixels 205.

As shown in FIG. 2C, during the exposure phase when the plurality of pixels 205 are operating in the global binning mode, global reset switch 210 is open (e.g., such that capacitor 225 is disconnected from reset voltage 230), respective individual reset switches 250, included in the plurality of pixels 205, are closed (e.g., such that each of the plurality of pixels 205 are concurrently connected to capacitor 225), and respective individual hold switches 252, included in the plurality of pixels 205, are open (e.g., such that photodiodes 254 are disconnected from capacitors 256 included in the plurality of pixels 205). Global select switch 215 can be open (e.g., such that capacitor 225 is disconnected from ADC 220) or closed during the exposure phase.

As indicated by the dotted arrows in FIG. 2C, capacitor 225 is discharged by the plurality of pixels 205 during the exposure phase. Here, each of the plurality of pixels 205 concurrently generates a respective photocurrent based on discharging capacitor 225. This results in a summed photocurrent in imaging system 200, where the summed photocurrent is a sum of the individual photocurrents concurrently generated by the plurality of pixels 205. In this way, the plurality of pixels 205 are binned during the exposure phase such that a summed photocurrent, corresponding to light absorbed by all of the plurality of pixels 205, is generated in imaging system 200.

In some implementations, at least during operation of the plurality of pixels 205 in the global binning mode, visible light is attenuated prior to generating the summed photocurrent. Notably, attenuation of visible light may be important for operation of the plurality of pixels 205 in the standard mode, such as when imaging system 200 operates as a ToF sensor. For example, the plurality of pixels 205 may include one or more components (e.g., an optical filter, a shield, and/or the like) designed to attenuate an amount of visible light incident on the plurality of pixels 205. For this reason, the summed photocurrent may be used in association with providing the ambient light sensing functionality and/or the proximity sensing functionality (e.g., since using a photocurrent generated by fewer than all the plurality of pixels 205 may be insufficient to generate an output that can be used to provide the ambient light sensing functionality and/or the proximity sensing functionality).

At the end of the exposure phase (e.g., after a defined period of time has passed), the plurality of pixels 205 is disconnected from capacitor 225 (e.g., by opening individual reset switches 250 included in the plurality of pixels 205). Here, a charge remaining in capacitor 225 (e.g., an amount of charge remaining in capacitor 225 that was not discharged via photodiodes 254) is based on the summed photocurrent generated by the plurality of pixels 205. As such, the charge remaining in capacitor 225 may correspond to the amount of light absorbed by the plurality of pixels 205.

FIG. 2D is an example illustrating operation of the plurality of pixels 205 during a readout phase when the plurality of pixels 205 are operating in the global binning mode. The readout phase is a phase during which a voltage signal, based on the charge remaining in capacitor 225, is provided to ADC 220 (e.g., for generating an output that can be used to identify the amount of light absorbed by the plurality of pixels 205).

As shown in FIG. 2D, during the readout phase when the plurality of pixels 205 are operating in the global binning mode, global reset switch 210 is open (e.g., such that capacitor 225 is disconnected from reset voltage 230), global select switch 215 is closed (e.g., such that capacitor 225 is connected to ADC 220), and respective individual reset switches 250, included in the plurality of pixels 205, are open (e.g., such that the plurality of pixels 205 are disconnected from capacitor 225). As indicated by the dotted arrow in FIG. 2D, the charge results in a voltage signal being provided to ADC 220 during the readout phase when the plurality of pixels 205 are operating in the global binning mode. Here, ADC 220 may receive the voltage signal and convert the voltage signal to a digital signal from which the amount of light absorbed by the plurality of pixels 205 can be determined. ADC 220 may then output the digital signal (e.g., to a controller, a processor, and/or the like) for use in providing an ambient light sensing functionality and/or a proximity sensing functionality.

In this way, the plurality of pixels 205 may operate in the global binning mode such that information associated with visible ambient light can be determined by imaging system 200 (e.g., for use in ambient light sensing and/or proximity sensing). In some implementations, the plurality of pixels 205, operating in the global binning mode, may include a majority of all pixels 205 included in imaging system 200. For example, the plurality of pixels 205, operating in the global binning mode, may include at least approximately 80% of all pixels 205 included in imaging system 200. In some implementations, such a majority of pixels operating in the global binning mode may be referred to as a super-pixel. In some implementations, imaging system 200 may operate the plurality of pixels 205 such that a single super-pixel is formed.

In some implementations, the plurality of pixels 205 of imaging system 200 may alternatively be operated in the standard mode (i.e., imaging system 200 can selectively operate the plurality of pixels 205 in the standard mode rather than the global binning mode). The standard mode is an operating mode in which the plurality of pixels 205 is not binned during the exposure phase such that an output during the readout phase corresponds to a set of photocurrents, each of which is separately generated by a respective pixel 205 of the plurality of pixels 205.

During a reset phase when operating in the standard mode, global reset switch 210 is closed, individual reset switches 250 are closed, individual hold switches 252 are closed, and individual select switches 262 are open (e.g., such that capacitors 256 are charged based on reset voltage 230). Here, global select switch 215 can be open (e.g., such that ADC 220 is disconnected from the plurality of pixels 205) or closed. Notably, global reset switch 210 remains closed throughout operation of the plurality of pixels 205 in the standard mode, and global select switch 215 remains open throughout operation of the plurality of pixels 205 in the standard mode.

During an exposure phase when operating in the standard mode, individual reset switches 250 of each of the plurality of pixels 205 is open (e.g., such that the plurality of pixels 205 are no longer connected to reset voltage 230 or to one another), individual hold switches 252 are closed, and individual select switches 262 are open. Here, each of the plurality of pixels 205 individually generates a separate photocurrent based on charges stored on the respective individual capacitors 256. In other words, the plurality of pixels 205 are not binned during the exposure phase. Thus, at the end of the exposure phase (e.g., when individual hold switches 252 are opened after a predefined period of time has passed), each capacitor 256 has a remaining amount of charge that corresponds to a photocurrent generated by an individual associated pixel 205.

During a readout phase when operating in the standard mode, individual reset switches 250 of each of the plurality of pixels 205 remain open and individual hold switches 252 are opened. In some implementations, one or more individual select switches 262, included in one or more of the plurality of pixels 205, can be closed (while others individual select switches 262 remain open) in order to cause a voltage signal, corresponding to the charge stored by the one or more capacitors 256 included in the one or more pixels 205, to be provided to an ADC for conversion to a digital signal. Individual select switches 262 may be selectively opened and closed in order to cause additional digital signals, associated with other pixels 205, to be output by the ADC, and imaging system 200 may provide depth sensing functionality and/or another type of imaging functionality based on these digital signals, as is known in the art.

The number and arrangement of components shown in FIGS. 2A-2D are provided as examples. In practice, there may be additional components, fewer components, different components, or differently arranged components than those shown in FIGS. 2A-2D. Furthermore, two or more components shown in FIGS. 2A-2D may be implemented within a single component, or a single component shown in FIGS. 2A-2D may be implemented as multiple, distributed devices and/or components. Additionally, or alternatively, a set of components (e.g., one or more components) shown in FIGS. 2A-2D may perform one or more functions described as being performed by another set of components shown in FIGS. 2A-2D.

Figure 3A:
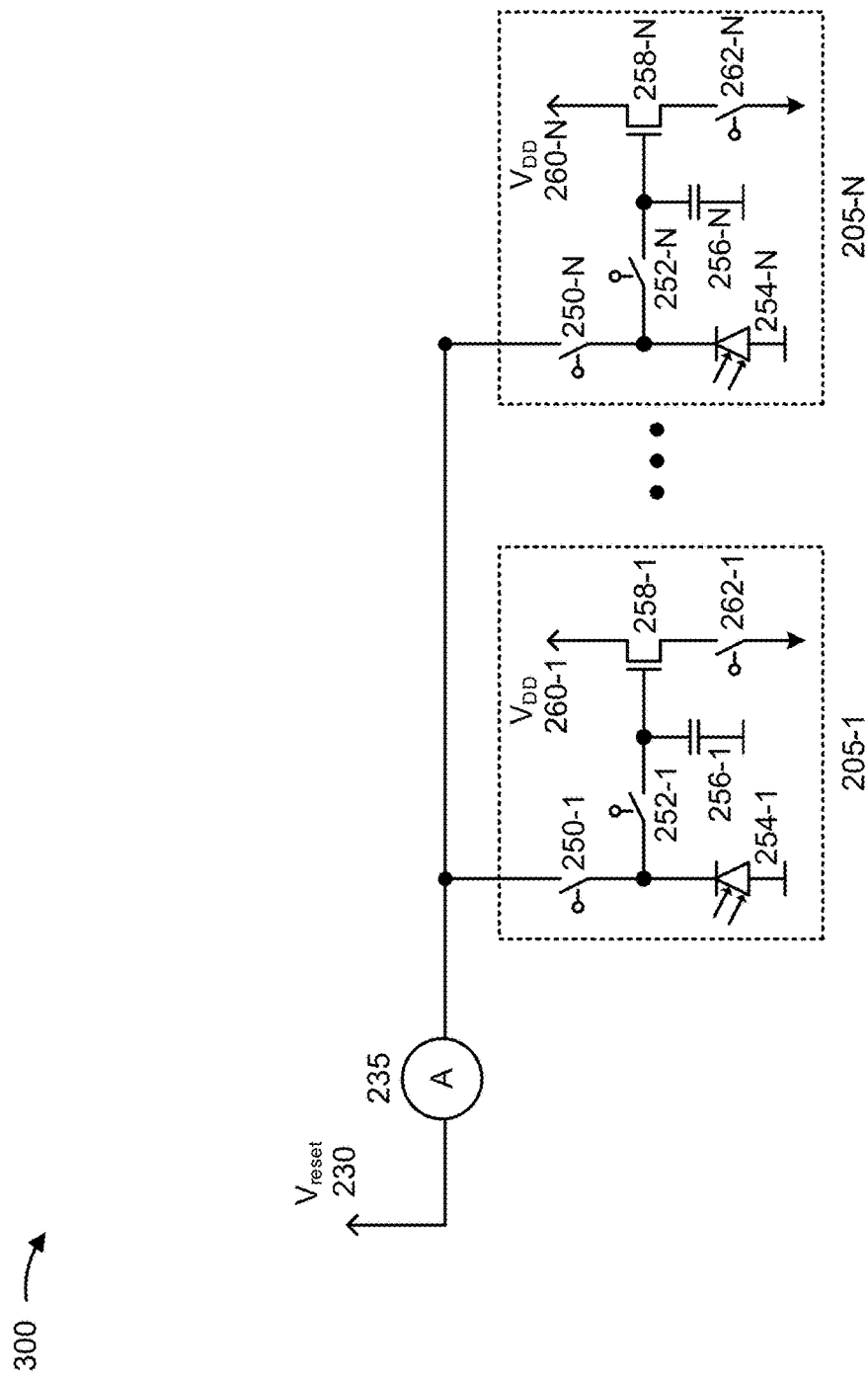
FIGS. 3A and 3B are diagrams associated with another example imaging system including a plurality of pixels that can be selectively operated in a global binning mode or a standard mode, as described herein.
Figure 3B:
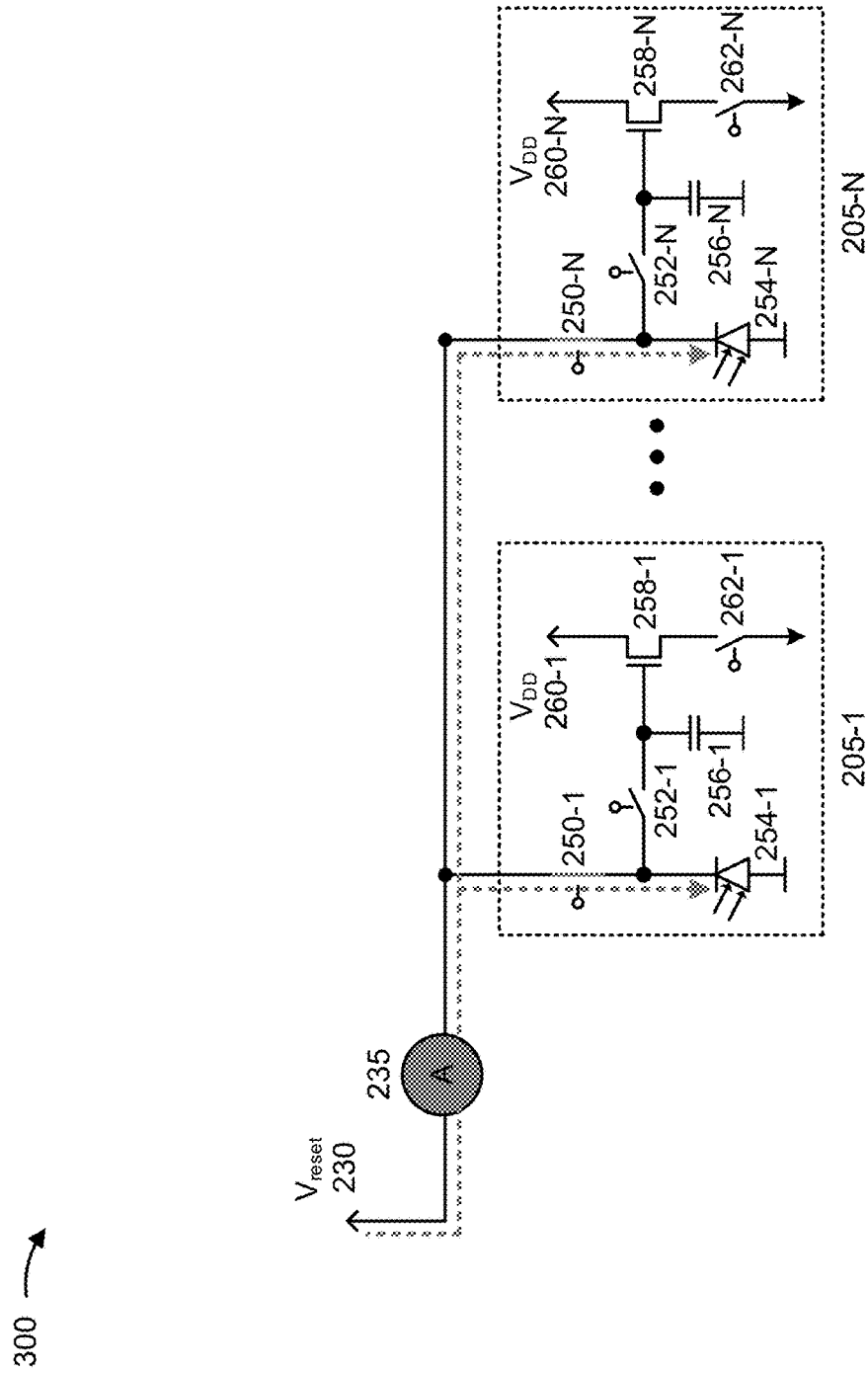

FIGS. 3A and 3B are diagrams associated with an example imaging system 300 including a plurality of pixels that can be selectively operated in a global binning mode or a standard mode, as described herein. In some implementations, imaging system 300 may include a CMOS imager, such as a time-of-flight imager.

FIG. 3A illustrates components of imaging system 300, while FIG. 3B illustrates operation of the plurality of pixels in the global binning mode. As shown in FIG. 3A, imaging system 300 may include a plurality of pixels 205 and a sensor 235. As shown, imaging system 300 may be connected to a reset voltage 230.

Sensor 235 includes a sensor to measure a current in imaging system 300 (e.g., a summed photocurrent generated by the plurality of pixels 205). For example, sensor 235 may include an ammeter or another type of device capable of current measuring device.

In some implementations, imaging system 300 can selectively operate the plurality of pixels 205 in the global binning mode or the standard mode. FIG. 3B illustrates an example operation of the plurality of pixels 205 in the global binning mode. Notably, the reset phase is not needed when the plurality of pixels 205 of imaging system 300 are operating in the global binning mode (e.g., since no capacitor is used in this example implementation).

As shown in FIG. 3B, when the plurality of pixels 205 are operating in the global binning mode during the exposure phase, respective individual reset switches 250, included in the plurality of pixels 205, are closed (e.g., such that each of the plurality of pixels 205 are connected to reset voltage 230), and respective individual hold switches 252, included in the plurality of pixels 205, are open in order to disconnect photodiodes 254 from capacitors 256 included in the plurality of pixels 205.

As indicated by the dotted arrows in FIG. 3B, each of the plurality of pixels 205 concurrently generates a respective photocurrent based on reset voltage 230. This results in a summed photocurrent in imaging system 300, where the summed photocurrent is a sum of the individual photocurrents concurrently generated by the plurality of pixels 205. Here, sensor 235 may measure the summed photocurrent, and may provide (e.g., during a readout phase, which may be concurrent with the exposure phase or after the exposure phase) an output corresponding to the measured photocurrent. In this way, the plurality of pixels 205 can be binned during the exposure phase such that a summed photocurrent, corresponding to light absorbed by all of the plurality of pixels, is generated by the plurality of pixels 205.

In some implementations, the plurality of pixels 205 of imaging system 300 may alternatively be operated in the standard mode (i.e., imaging system 300 can selectively operate the plurality of pixels 205 in the global binning mode or the standard mode). In some implementations, operation of the plurality of pixels 205 in imaging system 300 is similar that described above in association with imaging system 200.

The number and arrangement of components shown in FIGS. 3A and 3B are provided as examples. In practice, there may be additional components, fewer components, different components, or differently arranged components than those shown in FIGS. 3A and 3B. Furthermore, two or more components shown in FIGS. 3A and 3B may be implemented within a single component, or a single component shown in FIGS. 3A and 3B may be implemented as multiple, distributed devices and/or components. Additionally, or alternatively, a set of components (e.g., one or more components) shown in FIGS. 3A and 3B may perform one or more functions described as being performed by another set of components shown in FIGS. 3A and 3B.

Figure 4:
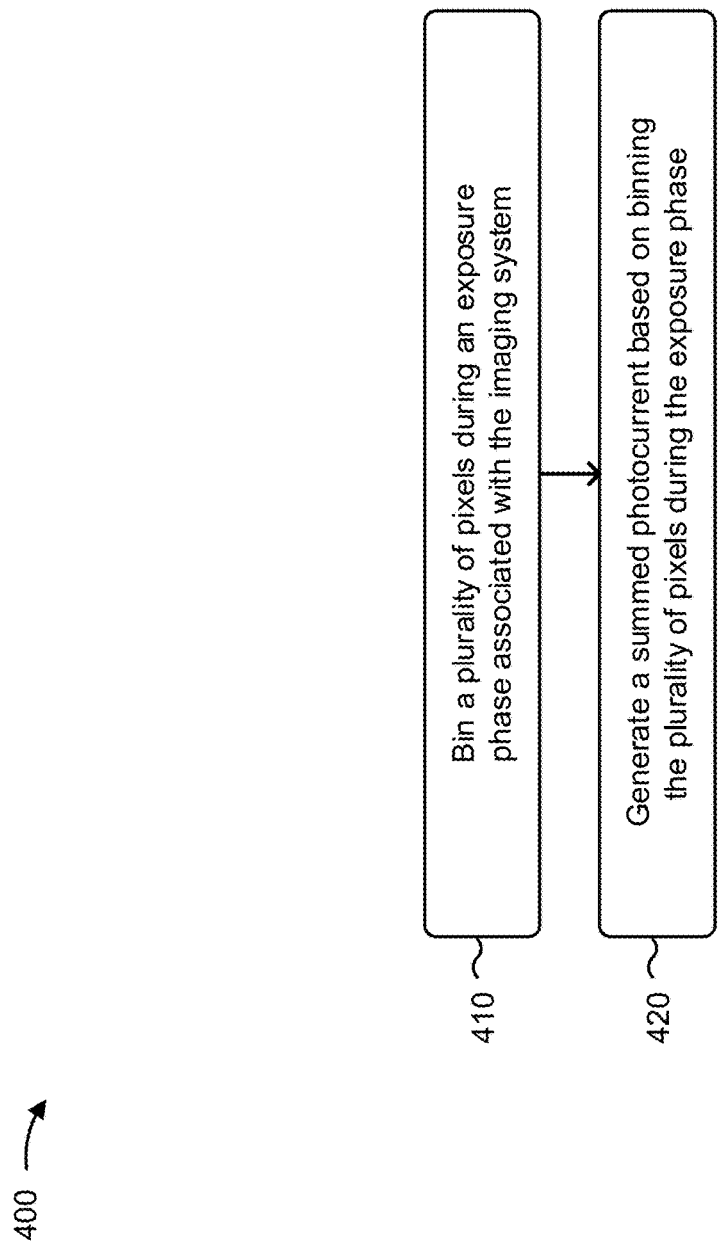
FIG. 4 is a flow chart of an example process associated with binning a plurality of pixels during an exposure phase associated with an imaging system.

FIG. 4 is a flow chart of an example process 400 associated with binning a plurality of pixels during an exposure phase associated with an imaging system. In some implementations, one or more process blocks of FIG. 4 may be performed by an imaging system, such as imaging system 200 or imaging system 300.

As shown in FIG. 4, process 400 may include binning a plurality of pixels during an exposure phase associated with an imaging system (block 410). For example, imaging system 200/300 may bin a plurality of pixels 205 during an exposure phase associated with imaging system 200/300, as described above.

In some implementations, the plurality of pixels 205 is binned during the exposure phase based on a plurality of individual reset switches 250 being closed during the exposure phase, and a plurality of individual hold switches 252 being open during the exposure phase. Here, each of the plurality of individual reset switches 250 is included in a respective one of the plurality of pixels 205, and each of the plurality of individual hold switches 252 is included in a respective one of the plurality of pixels 205, as described above.

As further shown in FIG. 4, process 400 may include generating a summed photocurrent based on binning the plurality of pixels during the exposure phase (block 420). For example, imaging system 200/300 may generate a summed photocurrent based on binning the plurality of pixels 205 during the exposure phase, as described above.

In some implementations, the summed photocurrent is a sum of a plurality of photocurrents, each generated by a respective one of the plurality of pixels 205. In other words, each of the plurality of pixels 205 concurrently generates a respective one of the plurality of photocurrents, and the plurality of photocurrents are summed in imaging system 200/300, as described above.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described here provide an imaging system 200/300 including a plurality of pixels 205 capable of selectively operating in a global binning mode or a standard mode. As described above, the global binning mode is an operating mode in which the plurality of pixels 205 is binned during an exposure phase such that an output during a readout phase corresponds to a sum of a plurality of concurrent photocurrents generated by the plurality of pixels 205 during the exposure phase. In some implementations, operation in the global binning mode allows imaging system 200/300 to provide ambient light sensing functionality and/or proximity sensing functionality, as described above.

Conversely, the standard mode is an operating mode in which the plurality of pixels 205 is not binned during the exposure phase such that an output during the readout phase corresponds to a set of separate photocurrents, each associated with one of a set of the plurality of pixels 205. As such, when operating in the standard mode, imaging system 200/300 may provide depth sensing functionality and/or another type of imaging functionality.

Thus, as described herein, a single imaging system (e.g., a single optical sensor) 200/300 may be capable of providing ambient light sensing functionality and/or proximity functionality in addition to imaging functionality (e.g., depth sensing, RGB imaging, and/or the like), thereby reducing area consumption associated with providing these sensing functionalities, reducing a number of components needed to provide these sensing functionalities, reducing a cost of imaging system 200/300, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An imaging system, comprising:
   a plurality of pixels to selectively operate in a first operating mode or a second operating mode,
   wherein, when operating in the first operating mode, the plurality of pixels are binned during an exposure phase such that an output during a readout phase corresponds to a summed photocurrent that is a sum of a plurality of concurrent photocurrents,
   each concurrent photocurrent corresponding to one of the plurality of pixels,
   wherein, when operating in the first operating mode and during the exposure phase, a global reset switch is open in order to disconnect the plurality of pixels from a reset voltage, and
   wherein, when operating in the second operating mode, the plurality of pixels are not binned during the exposure phase such that an output during the readout phase corresponds to a set of separate photocurrents,
   each separate photocurrent corresponding to one of a set of the plurality of pixels.

2. The imaging system of claim 1, wherein, during operation of the plurality of pixels in the first operating mode, the plurality of concurrent photocurrents are concurrently generated based on a charge that is discharged through each of the plurality of pixels during the exposure phase.

3. The imaging system of claim 2, wherein the charge is stored by a capacitor included in the imaging system before being discharged through each of the plurality of pixels.

4. The imaging system of claim 2, wherein the charge is stored in the imaging system as a result of a parasitic capacitance before being discharged through each of the plurality of pixels.

5. The imaging system of claim 1, further comprising an analog-to-digital convertor (ADC) to receive a voltage that results from the summed photocurrent during operation of the plurality of pixels in the first operating mode.

6. The imaging system of claim 1, wherein, when the plurality of pixels are operating in the first operating mode, the plurality of pixels are binned based on a plurality of individual reset switches being closed during the exposure phase, and a plurality of individual hold switches being open during the exposure phase,
   wherein each of the plurality of individual reset switches is included in a respective one of the plurality of pixels, and
   wherein each of the plurality of individual hold switches is included in a respective one of the plurality of pixels.

7. The imaging system of claim 1, wherein, when the plurality of pixels are operating in the first operating mode and during the readout phase:
   the global reset switch is open in order to disconnect the plurality of pixels from the reset voltage,
   a global select switch is closed in order to connect the plurality of pixels to an analog-to-digital convertor (ADC), and
   a plurality of individual reset switches are open,
      wherein each of the plurality of individual reset switches is included in a respective one of the plurality of pixels.

8. The imaging system of claim 1, wherein, when the plurality of pixels are operating in the first operating mode and during the exposure phase:
   a plurality of individual reset switches are closed,
      wherein each of the plurality of individual reset switches is included in a respective one of the plurality of pixels.

9. The imaging system of claim 1, wherein, when the plurality of pixels are operating in the first operating mode and during a reset phase:
   the global reset switch is closed in order to connect the plurality of pixels to the reset voltage.

10. The imaging system of claim 9, wherein, when the plurality of pixels are operating in the first operating mode and during the reset phase:
    a plurality of individual reset switches are open,
       wherein each of the plurality of individual reset switches is included in a respective one of the plurality of pixels.

11. The imaging system of claim 1, further comprising a sensor to measure the summed photocurrent during operation of the plurality of pixels in the first operating mode.

12. The imaging system of claim 1, wherein, during operation of the plurality of pixels in the first operating mode, the imaging system provides ambient light sensing functionality or proximity sensing functionality.

13. The imaging system of claim 1, wherein, during operation of the plurality of pixels in the first operating mode, a majority of all pixels of the imaging system is binned to form a single super-pixel.

14. The imaging system of claim 1, wherein the first operating mode has a single super-pixel.

15. The imaging system of claim 1, wherein the imaging system is a complementary metal-oxide-semiconductor (CMOS) imager.

16. The imaging system of claim 15, wherein the imaging system is a time-of-flight imager.

17. The imaging system of claim 1, wherein, during operation of the plurality of pixels in the first operating mode, information associated with visible ambient light is determined by the imaging system,
   wherein at least during operation of the plurality of pixels in the first operating mode, visible light is attenuated prior to generating the summed photocurrent.

18. A method, performed by an imaging system including a plurality of pixels, the method comprising:
   binning the plurality of pixels during an exposure phase associated with the imaging system,
      wherein, a global reset switch is open during the exposure phase in order to disconnect the plurality of pixels from a reset voltage,
      wherein the plurality of pixels are binned during the exposure phase based on a plurality of individual reset switches being closed during the exposure phase, and a plurality of individual hold switches being open during the exposure phase,
  wherein each of the plurality of individual reset switches is included in a respective one of the plurality of pixels, and
  wherein each of the plurality of individual hold switches is included in a respective one of the plurality of pixels; and
generating a summed photocurrent based on binning the plurality of pixels,
  wherein the summed photocurrent is a sum of a plurality of photocurrents,
    each photocurrent, of the plurality of photocurrents, being generated by a respective one of the plurality of pixels.

19. The method of claim 18, wherein the imaging system provides ambient light sensing functionality or proximity sensing functionality.

20. An imaging system, comprising:
a plurality of pixels,
  each pixel, of the plurality of pixels, including a respective individual reset switch and a respective individual hold switch;
a global reset switch,
  wherein the global reset switch is connected to a reset voltage and to all of the pixels included in the plurality of pixels, and
  wherein, when operating in a global binning mode and during an exposure phase, the global reset switch is open in order to disconnect the plurality of pixels from the reset voltage; and
a global select switch,
  wherein the global select switch is connected to all of the pixels included in the plurality of pixels, and to an analog-to-digital convertor (ADC).

* * * * *